United States Patent
Chang

[19]

[11] Patent Number: 6,045,311

[45] Date of Patent: Apr. 4, 2000

[54] BOLT, NUT, AND WRENCH IN TAPER DESIGN FOR TURNING THE BOLT AND THE NUT

[76] Inventor: Peter Jenn-Hai Chang, 3-1 Fl., No. 99, Sec. 2, Chung-Shan N. Rd., Taipei, Taiwan

[21] Appl. No.: 09/114,876

[22] Filed: Jul. 14, 1998

[51] Int. Cl.[7] .............................. F16B 23/00; F16B 35/06
[52] U.S. Cl. ............................ 411/402; 411/429; 411/919
[58] Field of Search .................................. 411/402, 410, 411/427, 429, 919

[56] References Cited

U.S. PATENT DOCUMENTS 5,682,801  11/1997  Waechter ............................ 411/402 X

FOREIGN PATENT DOCUMENTS

| 467397 | 10/1928 | Germany | 411/402 |
| 475002 | 2/1954 | Italy | 411/402 |
| 19638 | 11/1913 | United Kingdom | 411/402 |

*Primary Examiner*—Neill Wilson
*Attorney, Agent, or Firm*—Bacon & Thomas

[57] ABSTRACT

A nut is provided having a tapered, polygonal nut body, an axial coupling hole defined within the nut body, an inner thread provided on the inside of the nut body around the axial coupling hole, the nut body having a tapered, polygonal outside wall axially inwardly sloping from a front end thereof toward a rear end thereof. A socket wrench is provided having a socket integral with one end of a shaft thereof, the socket defining a tapered, polygonal coupling hole for coupling to the tapered, polygonal nut body of a nut, permitting the nut to be turned with the socket wrench.

3 Claims, 5 Drawing Sheets

BOLT, NUT, AND WRENCH IN TAPER DESIGN FOR TURNING THE BOLT AND THE NUT

BACKGROUND OF THE INVENTION

The present invention relates to a new structure of bolt and a new structure of nut, and a new structure of wrench for turning the bolt and the nut.

Various socket wrenches have been developed for turning bolts and nuts of different specifications. These conventional socket wrenches are commonly designed for turning a particular size of bolts and nuts. In facts, DIY (do-it-self) design furniture have been popularly accepted. In order to assemble different DIY design furniture, every family may prepare a variety of hand tools and tool accessories including socket wrenches, bolts, nuts, etc. However, it is not easy to find a particular size of socket wrench from a set of socket wrenches to fit a particular size of bolt or nut, or a particular size of bolt or nut from a set of bolts or nuts.

Further, regular nuts and sockets commonly have a manufacturing tolerance. However, a high manufacturing tolerance value may cause the socket of a socket wrench unable to be firmly secured to a nut, causing the nut unable to be positively turned with the socket wrench.

SUMMARY OF THE INVENTION

The present invention has been accomplished under the circumstances in view. It is one object of the present invention to provide a socket wrench which can be used to turn different bolts and nuts. It is another object of the present invention to provide a nut which can be turned with any of a variety of wrench means. It is still another object of the present invention to provide a bolt which can be turned with any of a variety of wrench means. A nut according to the present invention comprises a tapered, polygonal nut body, an axial coupling hole defined within the nut body, an inner thread provided on the inside of the nut body around the axial coupling hole, the nut body having a tapered, polygonal outside wall axially inwardly sloping from a front end thereof toward a rear end thereof. A socket wrench according to the present invention comprises a shaft, which can be a straight bar or a T-bar, and a socket integral with one end of the shaft, wherein the socket defines a tapered, polygonal coupling hole for coupling to the tapered, polygonal nut body of a nut, permitting the nut to be turned with the socket wrench. A bolt according to the present invention comprises a tapered, polygonal coupling rod axially raised from the head thereof for coupling to the socket of a socket wrench being used to turn the bolt.

DETAILED DESCRIPTION OF THE PREFERRED EMBODIMENT

Figure 1:
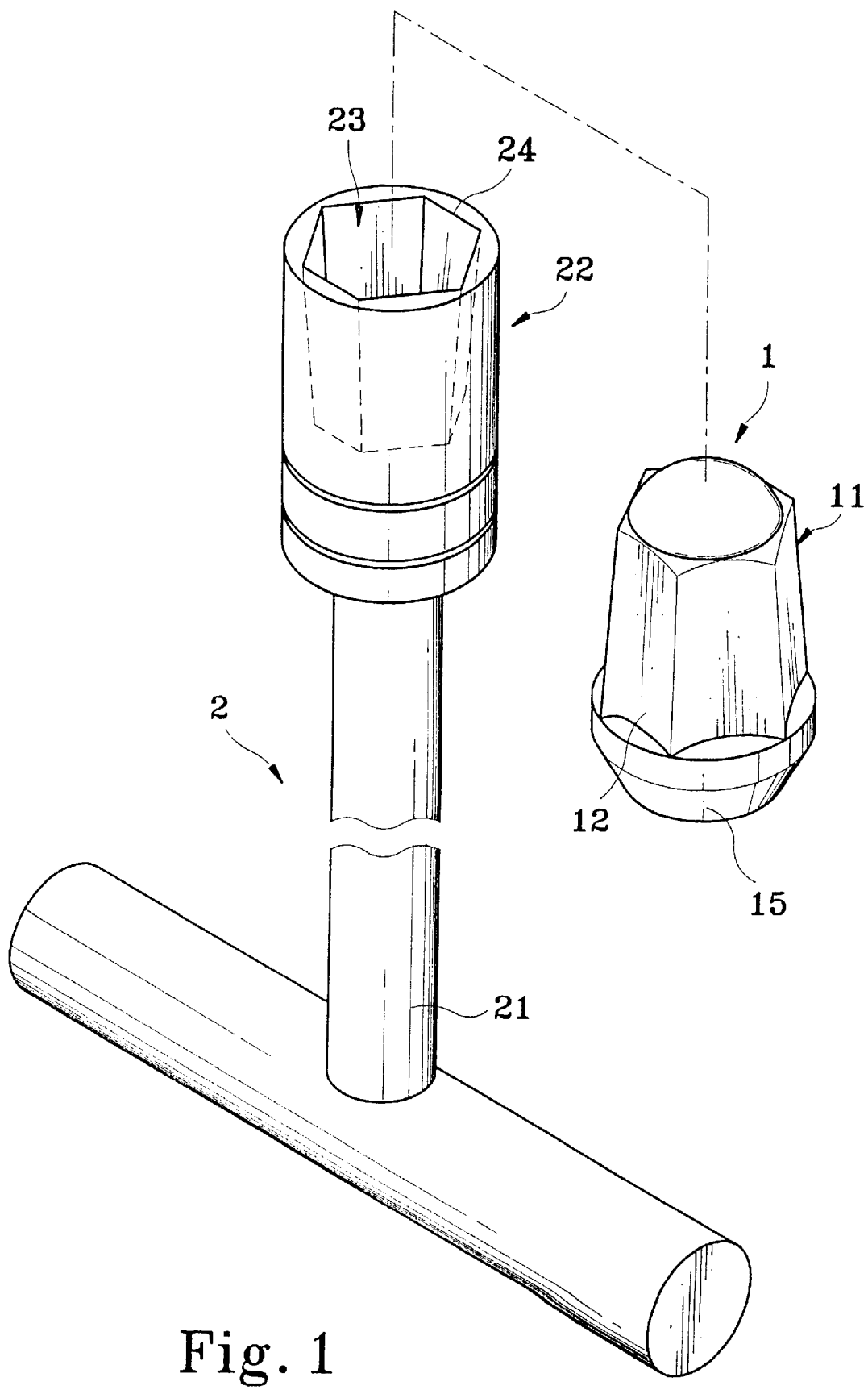
FIG. 1 illustrates a nut and a socket wrench according to the present invention.
Figure 2:
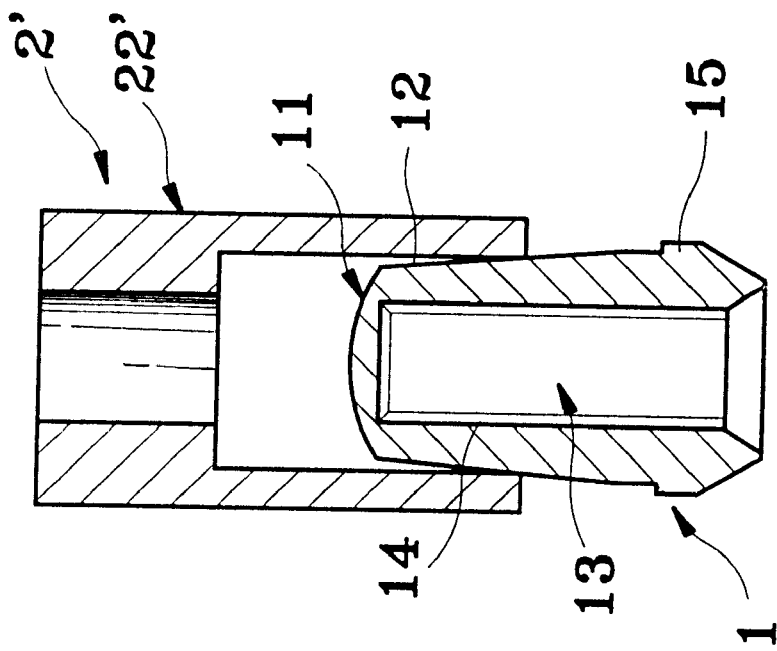
FIG. 2 is a sectional view showing the socket wrench attached to the nut body of the nut according to the present invention.

Referring to FIGS. 1 and 2, a nut 1 in accordance with the present invention comprises a tapered, polygonal nut body 11, an outward stop flange 15 raised around the nut body 11 at one end, an axial coupling hole 13 defined within the nut body 11, and an inner thread 14 provided at the inside wall of the hollow nut body 11 around the axial coupling hole 13. The nut body 11 has a tapered, polygonal outside wall 12 axially inwardly sloping from the stop flange 15. A socket wrench 2 in accordance with the present invention comprises a shaft 21, and a socket 22 integral with one end of the shaft 21. The socket 22 comprises a plurality of axially outwardly extended sloping inside walls 24 defining a tapered, polygonal coupling hole 23, which fits the nut body 11 of the nut 1. The depth of the coupling hole 23 is determined subject to the height of the nut body 11 of the nut 1.

Figure 3:
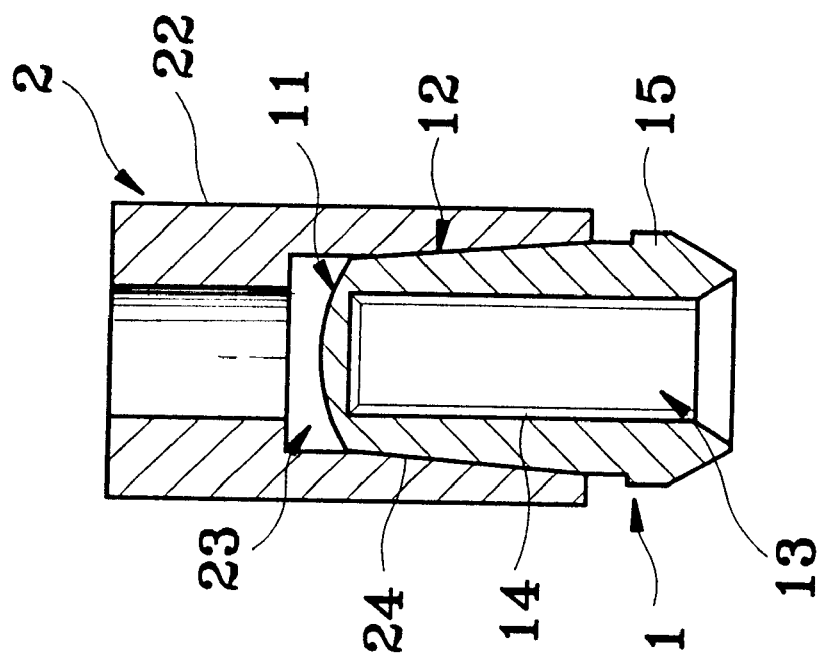
FIG. 3 is a sectional view showing a conventional socket wrench attached to the nut body of the nut according to the present invention.

Referring to FIG. 3, a conventional socket wrench 2' which has a polygonal socket 22' at one end can be used for turning the nut 1. When the polygonal socket 22' of the conventional wrench 2' is attached to the nut body 11 of the nut 1, the front end of the polygonal inside wall of the polygonal socket 22' is forced into engagement with the tapered, polygonal outside wall 12 of the nut body 11 at an elevation where the outer diameter of the nut body 11 is equal to the inner diameter of the polygonal socket 22', enabling the nut 1 to be positively turned with the socket wrench 1'.

Figure 4:
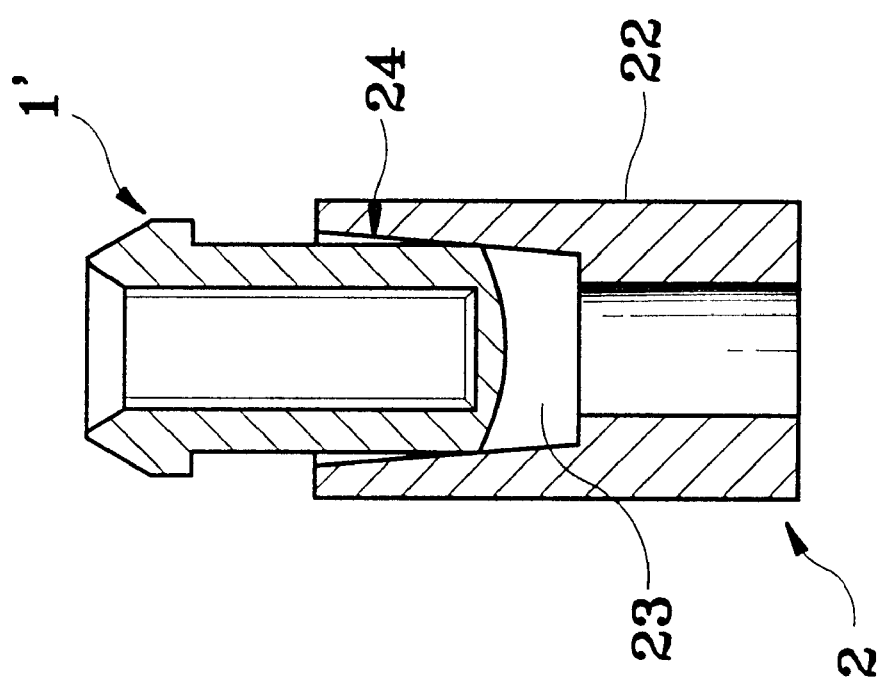
FIG. 4 is a sectional view showing the socket wrench of the present invention attached to a conventional nut.

Referring to FIG. 4, the socket wrench 2 can also be used to turn a conventional polygonal nut 1'. When the polygonal coupling hole 23 of the socket 22 is coupled to the conventional polygonal nut 1', the sloping inward wall 24 are forced into engagement with the periphery of the conventional polygonal nut 1', enabling the conventional polygonal nut 1' to be turned with the socket wrench 2.

Figure 5:
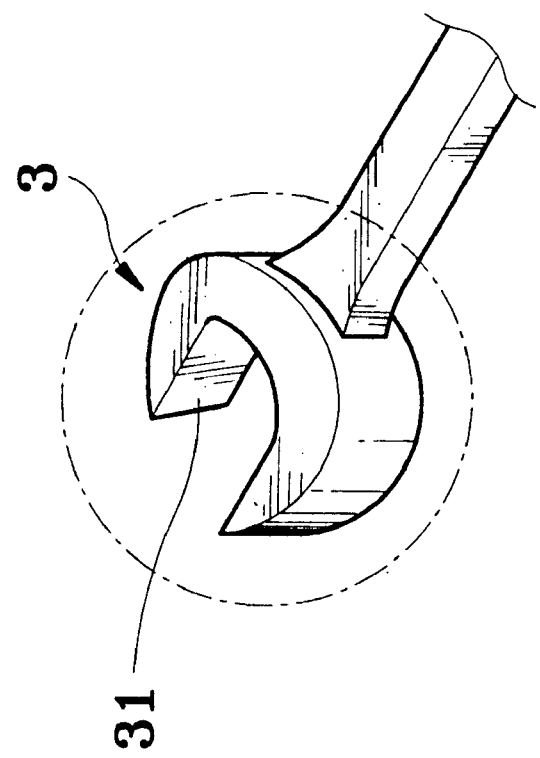
FIG. 5 illustrates the structure of an open end wrench constructed according to the present invention.
Figure 6:
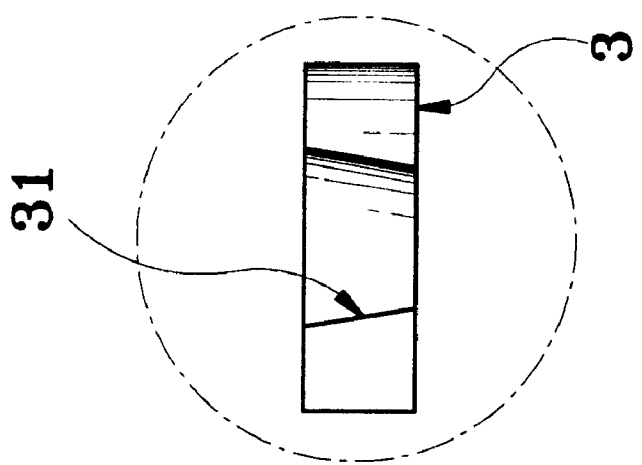
FIG. 6 is a front view of the open end wrench shown in FIG. 5.

Referring to FIGS. 5 and 6 and FIG. 1 again, the jaws 31 of the open end wrench 3 have a respectively inner face axially inwardly sloping in direction toward to each other to fit the tapered, polygonal nut body 11 of the nut 1.

Figure 7:
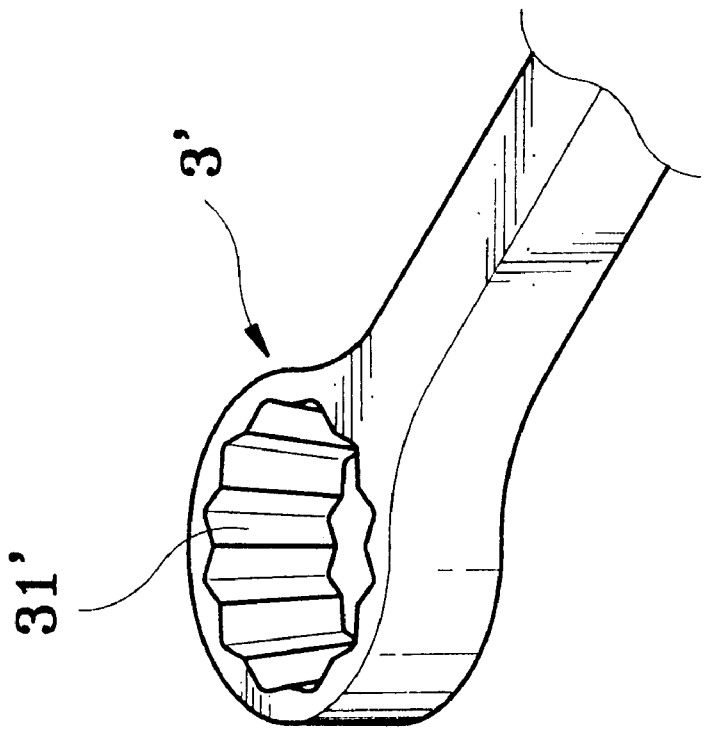
FIG. 7 illustrates the structure of a box end wrench constructed according to the present invention.

Referring to FIG. 7 and FIG. 1 again, the box end 31' of the box end wrench 3' has a tapered inner diameter fitting the tapered, polygonal outer diameter of the nut body 11 of the nut 1.

Figure 8:
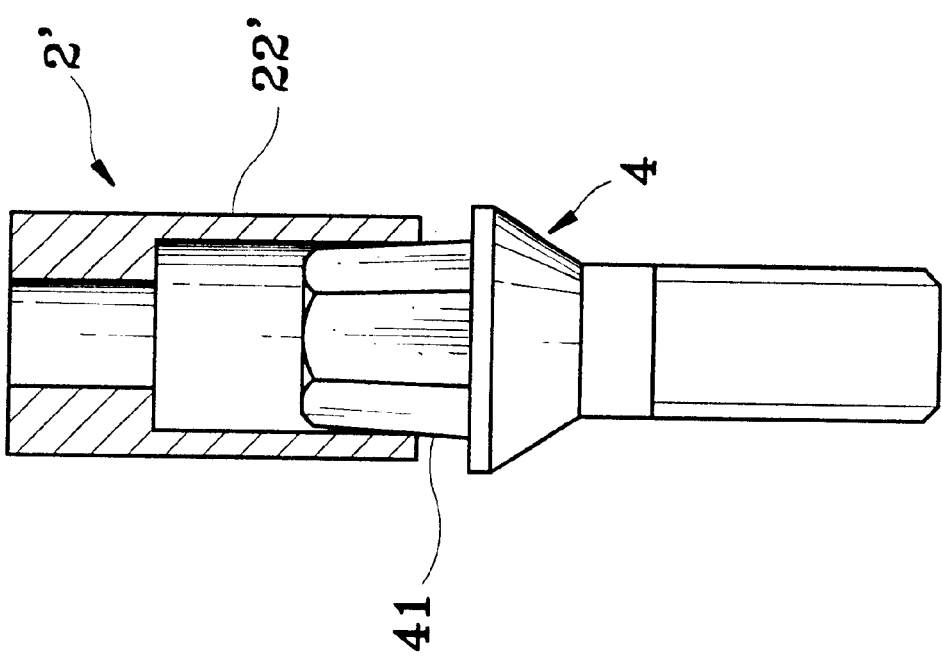
FIG. 8 illustrates a conventional socket wrench attached to the tapered, polygonal coupling rod of a bolt constructed according to the present invention.

Referring to FIG. 8, the bolt 4 comprises a tapered, polygonal coupling rod 41 axially raised from the head thereof for coupling to the socket 22' of a conventional socket wrench 2'.

As indicated above, the socket wrench 2 can be used to turn the nut 1 and any of a variety of conventional nuts and bolts, and the nut 1 can be turned with any of a variety of conventional wrenches.

What I claimed is:

1. A nut for threading on a screw member to fix two objects together, comprising a tapered, polygonal nut body, an axial coupling hole defined within said nut body, an inner thread provided on the inside of said nut body around said axial coupling hole, said nut body having a tapered, polygonal outside wall axially inwardly sloping from a front end thereof toward a rear end thereof and further comprising an outward stop flange raised around the front end of said nut body.

2. The nut of claim 1 wherein said axial coupling hole axially pierces through the front and rear ends of said nut body.

3. A bolt comprising a tapered, polygonal coupling rod axially raised from a head thereof, said rod body having a tapered, polygonal outside wall axially inwardly sloping from a front end thereof toward a rear end thereof and further comprising an outward stop flange raised around the front end of said rod body.

* * * * *